Nov. 20, 1945. H. A. SATTERLEE 2,389,461
FUEL COCK DRIVE MECHANISM
Filed July 27, 1942 2 Sheets-Sheet 1
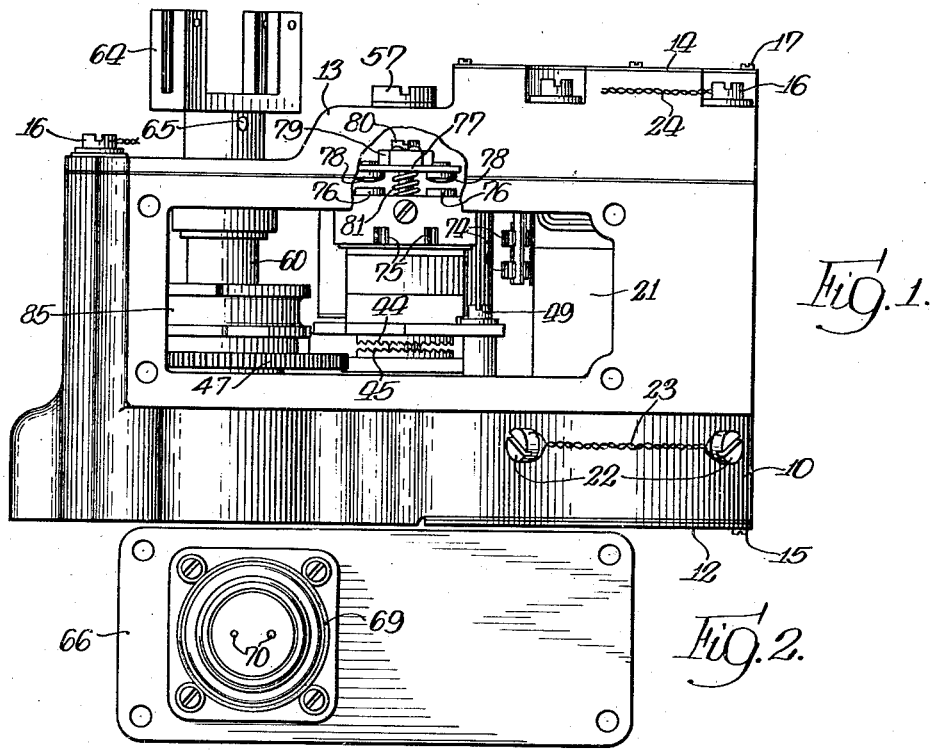
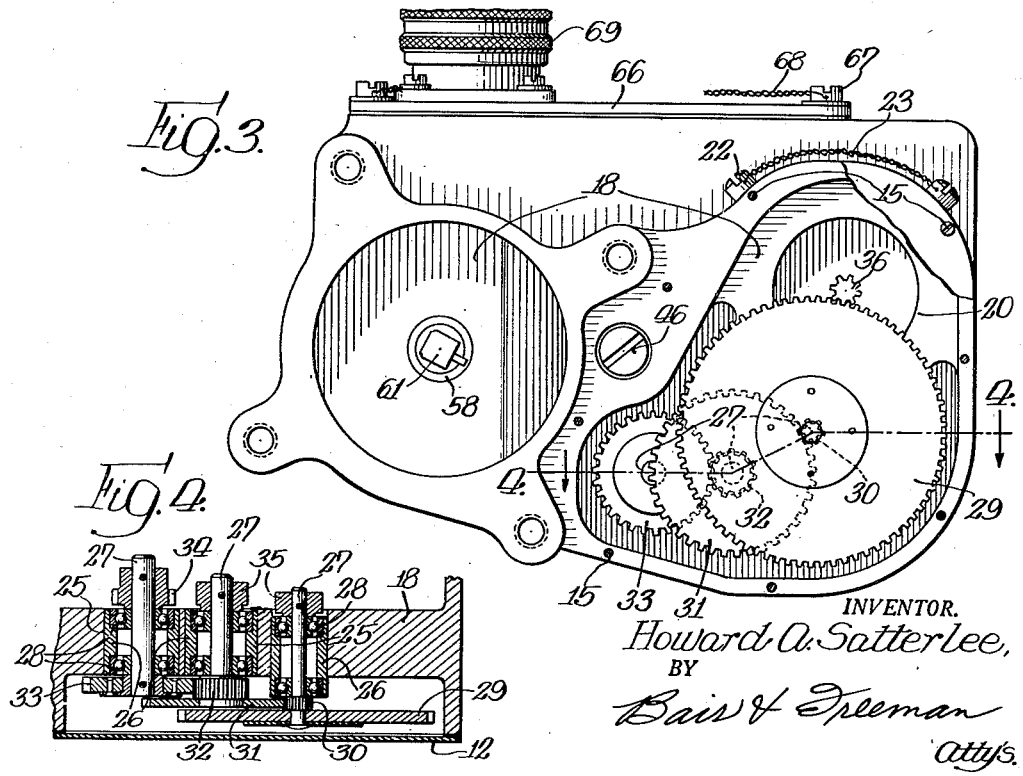
INVENTOR.
Howard A. Satterlee,
BY
Bair & Freeman
Attys.

Nov. 20, 1945.    H. A. SATTERLEE    2,389,461
FUEL COCK DRIVE MECHANISM
Filed July 27, 1942    2 Sheets-Sheet 2
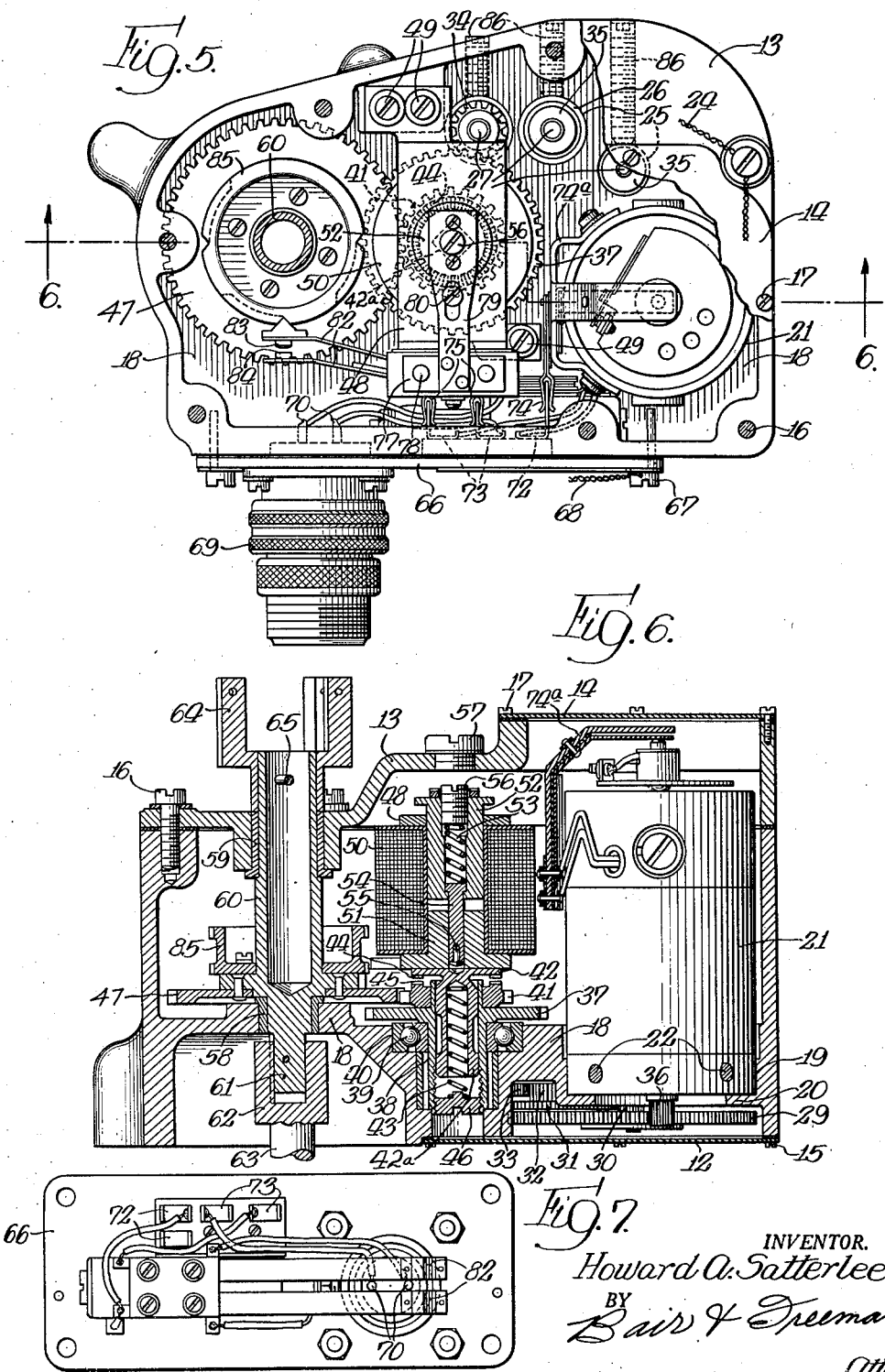
INVENTOR.
Howard A. Satterlee,
BY Bair & Freeman
Attys.

Patented Nov. 20, 1945

2,389,461

UNITED STATES PATENT OFFICE 2,389,461

FUEL COCK DRIVE MECHANISM

Howard A. Satterlee, Bryan, Ohio, assignor to The Aro Equipment Corporation, Bryan, Ohio, a corporation of Ohio Application July 27, 1942, Serial No. 452,485

19 Claims. (Cl. 74—421)

My present invention has to do with the mechanical arrangement of parts of a fuel cock drive mechanism such that there is ready access to each unit or sub-assembly of the fuel cock drive so that repair or replacement may be readily made in a minimum of time.

One object of the invention is to provide an improved arrangement of the mechanical parts of a fuel cock drive of the type shown in the copending applications of David Samiran, Serial No. 261,542, filed March 13, 1939, and Serial No. 352,427, filed August 13, 1940, the present arrangement using a circuit somewhat similar to that shown diagrammatically in the copending application of David Samiran, Serial No. 360,299, filed October 8, 1940, and my copending application Serial No. 408,233, filed August 25, 1941.

Another object is to provide a fuel cock drive mechanism wherein a motor, a valve shaft and the connecting parts between the motor and the valve shaft are each in the form of a sub-assembly which is so mounted in the housing of the device that they may be individually removed for repair or replacement without having to tear down the entire structure for the purpose of repairing or replacing different parts thereof.

A further object is to provide a fuel cock drive wherein the drive motor is removably mounted in a bore of a partition and normally retained in mounted position by set screws or the like.

Still a further object is to provide a clutch assembly mounted in another bore of the partition and retained therein by a solenoid assembly mounted on the partition whereby removal of the solenoid permits access for removal of the clutch assembly, the clutch assembly including a novel spring loading feature to secure a maximum of efficiency.

Still another object is to provide step-down gearing assemblies for operatively connecting the motor with the clutch assembly and each including a removable sleeve in the partition, a shaft and gear elements, which may be removed and replaced by the mere loosening of set screws for the sleeves after a cover plate is removed to gain access to the step-down gearing assemblies.

Still another object is to provide a cover plate arrangement to facilitate gaining access to the various assemblies, one of which is comprised of a main cover plate and a secondary cover plate so that when only the motor is to be removed the secondary plate only need be removed, whereas removal of the valve shaft, the solenoid and clutch assemblies necessitate removal of the main cover plate.

Still a further object is to provide a circuit connection plate which is also removable and so arranged that when it is removed, all the circuit connections with the motor, the solenoid and circuit controlling cams on the valve shaft, are automatically disconnected, whereas they are automatically reconnected whenever the connection plate is replaced.

With these and other objects in view, my invention consists in the construction, arrangement and combination of the various parts of my device whereby the objects contemplated are attained, as hereinafter more fully set forth, pointed out in the claims and illustrated in the accompanying drawings in which:

Figure 1 is a side elevation of a fuel cock drive mechanism embodying my invention, showing a connection plate removed therefrom and a part of the housing broken away to show a relay switch therein;

Figure 2 is a front elevation of the connection plate removed from Figure 1;

Figure 3 is a bottom plan view of Figure 1, showing a bottom cover plate broken and the major portion thereof removed;

Figure 4 is a sectional view on the line 4—4 of Figure 3, showing step-down gearing assemblies mounted in a partition of the housing;

Figure 5 is a plan view of Figure 1 with the cover plate therefor broken and the major portion thereof removed;

Figure 6 is a sectional view on the line 6—6 of Figure 5; and

Figure 7 is an inside or rear elevation of the connection plate shown in Figure 2.

On the accompanying drawings I have used the reference numeral 10 to indicate a housing. The housing 10 has a bottom cover plate 12, a main top cover plate 13 and a secondary top cover plate 14. The cover plates are suitably gasketed and removably positioned on the housing 10 with screws 15, 16 and 17 respectively for holding them in position.

The housing 10 has therein a partition 18. The partition 18 has a relatively large bore 19 terminating in a flange 20 (see Figure 6). A motor 21 is removably received in the bore 19 and is a snug fit therein so as to be properly aligned when received in the bore. For retaining the motor 21 in the bore a pair of screws 22 is provided which thread into the motor and, when properly tightened in position, are retained in such position by a safety wire 23. Similarly, the cover plate screws 16 are retained by a safety wire 24.

The partition 18 is provided with three gearing assembly bores 25 (see Figure 4). In each bore 25 a gearing assembly comprising a sleeve 26, a shaft 27, a pair of bearings 28 and gear and pinion elements are removably mounted. The three sets of gear and pinion elements are designated 29—30, 31—32 and 33—34. Two of the shafts have collars 35 thereon.

The gear 29 meshes with a pinion 36 on the shaft of the motor 21. The pinion 34 meshes with a clutch drive gear 37. The gear 37 is formed on a sleeve 38 journaled in a combined radial and thrust bearing 39. The bearing 39 is removably received in a bore 40 of the partition 18.

The clutch drive gear 37 is part of a clutch assembly, which also includes a pinion 41 freely rotatable on the sleeve 38, a clutch plate 42 and a spring 43. The spring 43 tends to keep the clutch plate 42 (which has clutch teeth or serrations 44 thereon to mesh with similar serrations 45 on the pinion 41) raised, so that the serrations 45 are normally disengaged. The spring is backed by an adjusting screw 46 threaded in the lower end of the sleeve 38. Above the threads for the screw the interior of the sleeve 38 is square and the lower end of a sleeve 42a depending from the clutch plate 42 is similarly shaped to provide a slidable but non-rotatable connection from the sleeve 38 to the sleeve 42a.

A solenoid assembly is provided in the form of a frame 48 removably secured as by three screws 49 (see Figure 5) to the partition 18, and further includes a solenoid 50 supported by the frame 48. The solenoid 50 has a stationary plug 51 in its lower end and a plunger 52 slidably mounted in its upper end. The plunger 52 is adapted to push the clutch plate 42 downwardly into mesh with the pinion 41 through a spring 53 and a pin 54. A hardened rivet 55 is mounted in the lower end of the pin for contacting the clutch plate 42.

The tension of the spring 53 may be adjusted by an adjusting screw 56. Access may be had to the adjusting screw 56 for the purpose of adjusting it while the mechanism is fully assembled and in operation, by the removal of a plug 57 in the main cover plate 13. The spring 53 is provided for spring loading the clutch plate 42 when the solenoid 50 is energized. This arrangement permits the clutch teeth 44 to be engaged with the clutch teeth 45, and the plunger 52 to be moved a slight distance further to close the air gap between it and the stationary plug 51 to thereby secure a maximum of magnetic pull on the plunger 52 in the clutch engaged position. Accordingly, the valve shaft 63 may be manually rotated, and will cause the teeth 45 to slip past the teeth 44, with the clutch plate 42 being thereby raised against the tension of the spring 53 without raising the plunger 52 and changing its magnetic attraction characteristic. The result is the possibility of using less current for energizing the solenoid 50 than would be necessary if the spring 53 were not provided.

The partition 18 has a bearing sleeve 58 therein, and the cover plate 13 has a bearing sleeve 59 therein. The sleeves 58 and 59 journal a tubular valve shaft 60 having a gear 47 meshing with the pinion 41. The lower end of the shaft 60 is squared as at 61 to fit in a socket 62 of a selector valve shaft 63. The selector valve may be one of the type used in connection with a plurality of fuel tanks for an aircraft engine, such as disclosed in the Samiran applications and patent hereinbefore mentioned.

A coupling member 64 is secured to the upper end of the valve shaft 60 as by a tapered pin 65, and is adapted for connection to a manually controlled knob so that the pilot can operate the selector valve by hand, if desired, or necessary.

A circuit connection plate 66 is removably positioned on the housing 10, it being normally secured thereto by screws 67 and a safety wire 68. The connection plate 66 has a fitting 69 connected therewith, which fitting is, in turn, connected with the end of a circuit wire carrying cable (not shown) in the usual manner. The fitting 69 has the usual socket members to coact with circuit carrying prongs 70 carried by the connection plate 66.

The connection plate has mounted thereon, and suitably insulated therefrom, two pairs of prong members 72 and 73. When the connection plate is mounted in position the prong members 72 enter a pair of socket members 74, supported on a bracket 74a and connected with the wiring of the motor 21. The bracket 74a is supported on and thereby removable with the motor 21. Similarly, the prong members 73 enter a pair of socket members 75 connected with the solenoid 50 and a pair of relay switch contacts 76 thereof.

The contacts 76 are adapted to be bridged by a relay blade 77 carrying a pair of contacts 78 engageable with the contact 76 when the solenoid 50 is energized. For this purpose the plunger 52 has an arm 79 formed of insulating material and secured thereto, the arm carrying the blade 77. A stop screw 80 is provided for limiting upward movement of the plunger 52 under the action of a spring 81 mounted on the stop screw.

The connection plate 66 also carries a pair of cam wipers 82 for controlling circuits through contacts 83 and 84 in accordance with the position of the valve shaft 60. For actuating the cam wipers 82, and thereby the contacts 83 and 84, a cam member 85 is mounted on the valve shaft 60. As shown in Figure 5, the cam member 85 is provided with notches and lobes coacting with the respective cam wipers 82 in a manner such as described in the Samiran patent hereinbefore referred to. When the connection plate 66 is mounted in position, it automatically positions the cam wipers 82 for proper coaction with the cam member 85. The various elements 70, 72, 73, 82, 83 and 84 on the connection plate 66 are properly wired together as shown (the wires being unnumbered).

From the foregoing description it is obvious that I have provided an arrangement of parts wherein the various assemblies may be removed for repair or replacement in a minimum of time. For inspection and servicing the connection plate 66 is first removed, which disconnects all wiring from the fuel cock drive mechanism, thus insuring against shocks or short-circuits. If it is desirable to remove only the motor 21, the secondary cover plate 14 may be removed, after which the motor may be lifted out of the bore 19 following proper unscrewing of the screws 22 therefrom.

If the adjustment of the screw 56 is to be changed, then only the plug 57 need be removed. However, if the solenoid 50 or the clutch assembly are to be removed, the pin 65 is driven out and the main cover plate 13 removed. Thereupon, the solenoid may be removed after the screws 49 are removed, whereupon, if it is desirable to remove the clutch assembly, it may be lifted out of the bore 40 after the valve shaft 60 is removed.

If any of the step-down gearing assemblies shown in Figure 4 are to be removed, or if adjustment of the plug 46 is necessary, the bottom cover plate 12 may be removed. The three sleeves 26 are retained in position by three set screws 86 (see Figure 5) so that when they are loosened the gearing assemblies may be removed, first, the one including the gear elements 31 and 32, and, finally, the one including the gear elements 33 and 34. Any one of these three may be repaired or replaced in a minimum of time, and this can be done without tearing down the other assemblies of the fuel cock drive mechanism.

The arrangement of elements in a fuel cock drive mechanism as described herein facilitates servicing the fuel cock drive mechanism and insures that any servicing operation can be performed in a minimum of time.

I have described the principle of operation and given an illustration of the mechanism in accordance with the provisions of the patent statutes. I consider the disclosure to represent one of the best embodiments thereof but I desire to have it understood that the structure disclosed is only illustrative, and that the invention may be carried out by other means within the scope of the appended claims.

What I claim is new and desire to secure by Letters Patent of the United States is:

1. In a fuel cock drive mechanism, a housing having a partition therein, a clutch drive gear, a clutch driven thereby, a motor for rotating said drive gear, said drive gear being journaled in said partition, said partition having a bore removably receiving said motor, means to retain said motor in said bore, step-down gearing assemblies for operatively connecting said motor with said clutch drive gear, each of said assemblies comprising a sleeve received in a bore of said partition, a shaft, bearings therefor supported in said sleeve, and gear elements, set screw means for retaining said sleeves removably in said partition, cover plates for said housing for gaining access to said motor, said clutch drive gear and said step-down gearing assemblies to permit individual removal thereof from said housing, a clutch operating solenoid mounted on said partition over said clutch drive gear, a plunger in said solenoid for engaging said clutch when the solenoid is energized, a relay switch carried by said partition and operated by energization of said solenoid, a valve shaft journaled in said partition and in one of said cover plates, a connector plate removably positioned on said housing and having prong and socket connections with said motor and said solenoid which cooperate with each other when the connector plate is positioned on the housing, a cam wiper carried by said connector plate, said valve shaft having a cam thereon, said cam wiper cooperating with said cam for circuit controlling purposes when said connector plate is positioned on said housing, and means for connecting an external circuit with the electrical elements of said connection plate.

2. In a fuel cock drive mechanism, a housing having a partition therein, said partition having a bore, a clutch and drive gear assembly removably positioned in said bore, a motor for rotating the drive gear of said assembly, said partition having a second bore receiving said motor, step-down gearing assemblies for operatively connecting said motor with said clutch drive gear, each of said gearing assemblies comprising a sleeve received in a bore of said partition, a shaft, bearings therefor supported in said sleeve and gear elements, cover plates for said housing, one of said cover plates comprising a main cover plate and a secondary cover plate, the secondary cover plate being located across the end of the motor, the other cover plate permitting access to said step-down gearing assemblies to permit individual removal thereof from said housing, a clutch operating solenoid mounted on said partition over said clutch and drive gear assembly, a plunger in said solenoid for engaging the clutch of said first assembly when the solenoid is energized, said other cover plate permitting access to said solenoid and said clutch, a valve shaft journaled in said partition and in said main cover plate, a connector plate removably positioned on said housing and having prong and socket connections with said motor and said solenoid which cooperate with each other when the connector plate is positioned on the housing, and external circuit connections with the electrical elements of said connection plate.

3. In a fuel cock drive mechanism, a housing having a partition therein, a motor and a plurality of step-down gearing assemblies removably mounted in said partition, each of said gearing assemblies including a sleeve, a shaft, bearings for journaling said shaft in said sleeve, and a pinion and a gear on the shaft, cover plates for said housing to gain access to said step-down gearing assemblies and said motor, one of said cover plates comprising a main cover plate and a secondary cover plate, the secondary plate being mounted over said motor, a clutch and drive gear assembly removably mounted in said partition, a solenoid mounted on said partition and normally retaining the clutch of said last assembly in the partition, said clutch having interchangeable clutch elements, a plunger for said solenoid to cause engagement of said clutch elements with each other when the solenoid is energized, said main cover plate when removed permitting access to said solenoid for removing the same from said partition, said plunger including spring means exerting a predetermined pressure on said clutch elements when said solenoid is energized, an adjusting screw for said spring means, said main cover plate having a removable plug for gaining access to said adjusting means without removing said main cover plate, and a valve shaft journaled in said housing and operatively connected with said clutch assembly to be rotated thereby when said clutch elements are so engaged.

4. In a fuel cock drive mechanism, a housing having a partition therein, a motor and a plurality of step-down gearing assemblies removably mounted in said partition, each of said gearing assemblies including a sleeve in a bore of said partition, cover plates for said housing to gain access to said step-down gearing assemblies and said motor, a clutch and drive gear assembly removably mounted in said partition, a solenoid mounted in a position to normally retain the clutch of said last assembly in said partition, said clutch including a pair of clutch elements, a plunger for said solenoid to effect engagement of said clutch elements with each other when the solenoid is energized, said plunger including spring means exerting a predetermined pressure on said clutch elements when said solenoid is energized, an adjusting means for said spring means, one of said cover plates having a removable plug for gaining access to said adjusting means without removing the cover plate, and a valve shaft journaled in said housing and geared to one of said clutch elements to be rotated thereby when such engagement is effected.

5. A fuel cock drive mechanism comprising a housing having a partition between opposite walls thereof, a clutch and drive gear assembly journaled in said partition, a solenoid mounted on said partition, a plunger therein for engaging the clutch of said assembly, a motor for driving said drive gear, a plurality of gearing assemblies for effecting an operative connection between said motor and said drive gear, cover plates on said walls for gaining access to said solenoid to permit removal thereof from said partition, to said motor and to said gearing assemblies, said partition having a bore removably receiving said clutch and drive gear assembly, said clutch and drive gear assembly being removable from said bore when said solenoid is removed from said partition, a valve shaft journaled in one of said cover plates and in said partition and operatively connected with said clutch whereby it is rotated thereby when the clutch rotates, and means for effecting circuit connections with said solenoid comprising a connection plate having prong and socket connections with said motor and said solenoid, said connection plate being removable from said housing whereupon said prong and socket connections are disengaged from each other.

6. A fuel cock drive mechanism comprising a housing having a partition, a clutch and drive gear assembly journaled in said partition, a solenoid mounted on said partition, a plunger therein for engaging the clutch of said assembly, a cover plate for gaining access to said solenoid to permit removal thereof from said partition, said partition having a bore removably receiving said clutch and drive gear assembly, said assembly being removable from said bore when said solenoid is removed from said partition, a valve shaft journaled in said cover plate and in said partition and having a gear meshing with said drive gear for rotation simultaneously therewith, and means for effecting circuit connections with said solenoid comprising a connection plate having prong and socket connections therewith, said connection plate being removable from said housing whereupon said prong and socket connections are disengaged from each other.

7. In a fuel cock drive mechanism, a housing having a partition, a motor and a clutch mounted in said partition, a solenoid positioned on said partition and operable to control said clutch, a valve shaft journaled in said housing and geared to said clutch assembly for rotation thereby, a circuit connection plate removably mounted on said housing and having prong and socket connections with said solenoid and said motor when said connection plate is mounted on said housing, said valve shaft having a cam provided with a cam lobe, and a cam wiper carried by said connection plate in position to be engaged by said cam lobe when said connection plate is mounted on said housing and said cam is rotated, and circuit controlling contacts opened and closed by said cam wiper.

8. In a fuel cock drive mechanism, a housing having a partition, a motor and a clutch removably mounted in said partition, a solenoid for operating said clutch, said solenoid being mounted on said partition, a valve shaft journaled in said housing and geared to said clutch for operation thereby, a circuit connection plate removably mounted on said housing and having prong and socket connections with said solenoid and said motor when said connection plate is mounted on said housing, said valve shaft having a cam, a cam wiper carried by said connection plate in position to engage a lobe of said cam when said connection plate is mounted on said housing and the cam is rotated, contacts adapted to be opened and closed by movement of said cam wiper, and external circuit connections carried by said connection plate and electrically connected with said contacts and with said prong and socket connections.

9. A fuel cock drive mechanism comprising a housing having a partition therein, a clutch, a drive gear, a motor for rotating said drive gear, said drive gear being journaled in said partition, said partition having a bore removably receiving said motor, step-down gearing assemblies for operatively connecting said motor with said clutch drive gear, each of said gearing assemblies including a sleeve received in a bore of said partition, cover plates for said housing for gaining access to said motor, said clutch and said step-down gearing assemblies to permit individual removal thereof from said housing, a clutch operating solenoid mounted over said clutch, a plunger in said solenoid for engaging said clutch, a valve shaft journaled in said housing, and a connector plate removably positioned on said housing and having prong and socket connections with said motor and said solenoid which cooperate with each other when the connector plate is positioned on the housing.

10. A fuel cock drive mechanism comprising a housing having a partition therein, a clutch journaled in said partition, a motor for rotating said clutch, said partition having a bore removably receiving said motor, means to retain said motor in said bore, step-down gearing assemblies for operatively connecting said motor with said clutch, each of said gearing assemblies comprising a sleeve received in a bore of said partition, a shaft, bearings therefor supported in said sleeve and gear elements, means for retaining said sleeves removably in said partition, a clutch operating solenoid mounted over said clutch, a plunger in said solenoid for engaging said clutch, cover plates for said housing for gaining access to said motor, said clutch, said solenoid and said step-down gearing assemblies to permit individual removal thereof from said housing, a valve shaft journaled in said partition and in one of said cover plates, and a connector plate removably positioned on said housing and having prong and socket connections with said motor and said solenoid which cooperate with each other when the connector plate is positioned on the housing.

11. In a fuel cock drive mechanism, a housing having a partition therein, a motor and a plurality of step-down gearing assemblies removably mounted in said partition, each of said gearing assemblies including a sleeve received in a bore of said partition, said partition also having a bore receiving said motor, cover plates for said housing to gain access to said step-down gearing assemblies and said motor, a clutch removably mounted in another bore of said partition and having interengageable clutch elements, a solenoid mounted on said partition and normally retaining said clutch assembly in said last bore, a plunger for attraction by said solenoid when energized to engage together said clutch elements, one of said main cover plates when removed permitting access to said solenoid, and a valve shaft journaled in said partition and said main cover plate and operatively connected to said clutch.

12. A fuel cock drive mechanism comprising a housing having a partition, a clutch journaled in said partition and having a pair of interengageable clutch elements, a solenoid mounted on said partition, a plunger therein for engaging said clutch elements together, a cover plate for gaining access to said solenoid to permit removal thereof from said partition, said clutch being removable from said partition when said solenoid is removed therefrom, and a valve shaft journaled in said cover plate and in said partition and driven by means including said clutch when its clutch elements are engaged by said plunger.

13. A fuel cock drive mechanism comprising a housing having a partition, a clutch journaled in said partition, a solenoid mounted on said partition, a plunger therein for engaging said clutch, a cover plate for gaining access to said solenoid to permit removal thereof from said partition, said plunger including a spring pressure device, an adjusting screw therefor, a plug in said cover plate to gain access to said adjusting screw, a valve shaft journaled in said cover plate and in said partition and driven by means including said clutch when said solenoid attracts said plunger, and means for effecting circuit connections with said solenoid comprising a removable connection plate on said housing having prong and socket connections therewith.

14. In a fuel cock drive mechanism of the character described, a housing having a partition, a motor and a clutch removably mounted in said partition, a solenoid retaining said clutch in said partition and removably mounted on said partition, a valve shaft journaled in said housing and operatively connected with said clutch, a circuit connection plate removably mounted on said housing and having prong and socket connections with said solenoid and said motor when said connection plate is mounted on said housing, said valve shaft having a cam, a cam wiper carried by said connection plate in position to cooperate with said cam when said connection plate is mounted on said housing, circuit controlling contacts controlled by said cam wiper and external circuit connections carried by said connection plate and electrically connected with said prong and socket devices and with said circuit controlling contacts of said cam wiper.

15. In a fuel cock drive mechanism of the character described, a housing having a partition, a motor and a clutch mounted in said partition, a solenoid removably mounted on said partition, a valve shaft journaled in said housing, a geared connection between said clutch and said valve shaft whereby the shaft is driven by said clutch assembly when it is rotated by said motor, a circuit connection plate removably mounted on said housing and having prong and socket connections with said solenoid and said motor when said connection plate is mounted on said housing, said valve shaft having a cam, a cam wiper carried by said connection plate in position to cooperate with said cam when said connection plate is mounted on said housing, and circuit controlling contacts carried by said connection plate and controlled by said cam wiper.

16. In a fuel cock drive mechanism, a housing, a clutch including a drive gear, a motor in said housing for rotating said drive gear, said drive gear being journaled in said housing, step-down gearing assemblies for operatively connecting said motor with said clutch, cover plates for said housing for gaining access to said motor, said clutch, and said step-down assemblies to permit individual removal thereof from said housing, a clutch operating solenoid for said clutch, a valve shaft journaled in said housing, a geared connection between said clutch and said valve shaft whereby the shaft is driven by said clutch when it is rotated by said motor, a connector plate removably positioned on said housing and having prong and socket connections with said motor and said solenoid, and means for connecting an external circuit with the connections of said connector plate.

17. A fuel cock drive mechanism comprising a housing having a partition therein, a motor and a plurality of step-down gearing assemblies removably mounted in said partition, cover plates for said housing to gain access to said step-down gearing assemblies and said motor, a clutch removably mounted in said partition, said step-down gearing assemblies constituting a driving connection from said motor to said clutch, a solenoid mounted on said partition, a plunger for said solenoid to effect rotation of said clutch from said motor where said solenoid is energized, one of said main cover plates when removed permitting access to said solenoid for removing the same from said housing, and a valve shaft journaled in said partition and said main cover plate and driven by said clutch upon rotation thereof.

18. In a fuel cock drive mechanism, a housing having a partition therein, a motor, a plurality of step-down gearing assemblies removably mounted in said partition and constituting part of the driving connection from said motor, cover plates for said housing to gain access to said step-down gearing assemblies and said motor, a solenoid operated clutch operated by said driving connection from said motor when the solenoid is energized, and a valve operating shaft journaled in said housing and geared to said clutch for rotation thereby.

19. A fuel cock drive mechanism comprising a housing having a partition, a motor and a clutch mounted in said partition, said clutch including a pair of clutch elements capable of engagement and disengagement with relation to each other; a solenoid mounted on said partition, a plunger therein for engaging the clutch elements of said clutch assembly with each other, a cover plate for gaining access to said motor and said solenoid, a valve shaft journaled in said housing and driven by said clutch assembly upon engagement of said clutch elements, and means for effecting circuit connections with said motor and said solenoid comprising a connection plate having prong and socket connections therewith, said connection plate being removable from said housing whereupon said prong and socket connections are disengaged from each other.

HOWARD A. SATTERLEE.